US010113601B2

(12) United States Patent
Masuda

(10) Patent No.: US 10,113,601 B2
(45) Date of Patent: Oct. 30, 2018

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/272,962

(22) Filed: Sep. 22, 2016

(65) Prior Publication Data

US 2017/0009834 A1 Jan. 12, 2017

Related U.S. Application Data

(63) Continuation of application No. PCT/JP2015/058219, filed on Mar. 19, 2015.

(30) Foreign Application Priority Data

Mar. 27, 2014 (JP) .................................. 2014-065266

(51) Int. Cl.
*F16D 66/02* (2006.01)
*F16D 65/18* (2006.01)
(Continued)

(52) U.S. Cl.
CPC .......... *F16D 66/025* (2013.01); *B60T 13/741* (2013.01); *F16D 55/226* (2013.01);
(Continued)

(58) Field of Classification Search
CPC ...... F16D 65/025; F16D 65/02; F16D 66/021; F16D 66/022; F16D 66/023;
(Continued)

(56) References Cited

U.S. PATENT DOCUMENTS 6,367,597 B1* 4/2002 De Vries ................. B60T 13/74
188/196 V
7,445,091 B2 11/2008 Kawahara et al.
(Continued)

FOREIGN PATENT DOCUMENTS

CN 101103215 1/2008
CN 101194408 6/2008
(Continued)

OTHER PUBLICATIONS

International Search Report dated Jun. 23, 2015 in corresponding International Application No. PCT/JP2015/058219.
(Continued)

*Primary Examiner* — Melanie Torres Williams

(57) ABSTRACT

Provided is an electric brake device that can prevent a pad wear from progressing beyond its limit, and can estimate the wear of the friction pad without an increase in cost and space. The electric brake device includes: an electric motor; a brake rotor; a friction pad; a linear motion mechanism; a braking force command section; a braking force estimation section; a motor rotation angle detector; and a controller. The controller is provided with a pad wear amount estimation section configured to estimate a wear amount of the friction pad at a present time by comparing a correlation between the motor rotation angle detected by the motor rotation angle detector and the braking force obtained by the braking force estimation section with a defined correlation between a motor rotation angle and a braking force when the friction pad is unworn.

6 Claims, 6 Drawing Sheets

(51) Int. Cl.
*B60T 13/74* (2006.01)
*F16D 55/226* (2006.01)
*F16D 121/24* (2012.01)
*F16D 125/40* (2012.01)

(52) U.S. Cl.
CPC ............ *F16D 65/18* (2013.01); *F16D 66/021* (2013.01); *F16D 2121/24* (2013.01); *F16D 2125/40* (2013.01)

(58) Field of Classification Search
CPC .... F16D 55/226; F16D 65/18; F16D 2125/24; F16D 2125/40; F16D 2125/20; B60T 13/741
See application file for complete search history.

(56) References Cited

U.S. PATENT DOCUMENTS

| | | | |
|---|---|---|---|
| 7,810,616 | B2 | 10/2010 | Nakazeki |
| 8,109,370 | B2 | 2/2012 | Yamasaki |
| 8,827,051 | B2 | 9/2014 | Yamasaki |
| 8,833,526 | B2 | 9/2014 | Goto et al. |
| 8,997,947 | B2 | 4/2015 | Shiraki |
| 2008/0029355 | A1 | 2/2008 | Kawahara et al. |
| 2008/0110704 | A1 | 5/2008 | Nakazeki |
| 2009/0095579 | A1 | 4/2009 | Yamasaki |
| 2009/0218179 | A1* | 9/2009 | Yokoyama ............ B60T 13/741 188/1.11 L |
| 2012/0073393 | A1 | 3/2012 | Yamasaki |
| 2012/0193177 | A1 | 8/2012 | Goto et al. |
| 2014/0000990 | A1* | 1/2014 | Shiraki .................. F16D 65/66 188/71.8 |

FOREIGN PATENT DOCUMENTS

| | | |
|---|---|---|
| EP | 2 687 745 | 1/2014 |
| GB | 2029528 | 3/1980 |
| JP | 59-40028 | 3/1984 |
| JP | 61-127931 | 6/1986 |
| JP | 61-46689 | 10/1986 |
| JP | 6-327190 | 11/1994 |
| JP | 2002-205634 | 7/2002 |
| JP | 2002-213507 | 7/2002 |
| JP | 2006-298132 | 11/2006 |
| JP | 2010-6165 | 1/2010 |
| JP | 4463812 | 2/2010 |
| JP | 4756230 | 6/2011 |
| JP | 2012-159134 | 8/2012 |

OTHER PUBLICATIONS

International Preliminary Report on Patentability dated Oct. 6, 2016 in corresponding International Patent Application No. PCT/JP2015/058219.
Notice of Reason(s) for Rejection dated Nov. 28, 2017 in corresponding Japanese Patent Application No. 2014-065266, 3 pages.
Chinese Office Action dated Nov. 28, 2017 in corresponding Chinese Patent Application No. 201580016255.X, 6 pages.
Extended and Supplementary European Search Report dated Dec. 1, 2017 in corresponding European Patent Application No. 15767810.3, 7 pages.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2015/058219, filed Mar. 19, 2015, which is based on and claims Convention priority to Japanese patent application No. 2014-065266, filed Mar. 27, 2014, the entire disclosure of which is herein incorporated by reference as a part of this application.

BACKGROUND OF THE INVENTION

Field of the Invention

The present invention relates to an electric brake device that can detect the progression of wear of a friction pad at all times to prevent the friction pad from reaching its wear limit, thereby allowing a maintenance work or the like to be performed at an appropriate time.

Description of Related Art

As conventional methods for controlling an electric brake, the following techniques have been proposed.

(1) An electric brake device using a motor and a linear motion mechanism (Patent Document 1).

(2) A method in which the wear limit is detected by using a contact terminal embedded in a brake pad (Patent Document 2).

(3) A method in which the pad wear limit is detected based on vibrations of a projection provided at the same position as that of the pad wear limit (Patent Document 3).

(4) A method in which the pad wear amount is estimated from relative positions of slide pins and a caliper during braking (Patent Document 4).

RELATED DOCUMENT

Patent Document

[Patent Document 1] JP Laid-open Patent Publication No. H06-327190

[Patent Document 2] JP Laid-open Patent Publication No. S61-127931

[Patent Document 3] JP Laid-open Patent Publication No. S59-040028

[Patent Document 4] JP Examined Patent Publication No. S61-046689

With the electric brake device (1) using the motor and the linear motion mechanism, there is a possibility that the friction pad may undesirably undergo excessive wear when, for example, an operator or the like does not regularly inspect the wear state of the friction pad.

With the method (2) in which the wear limit is detected by using the contact terminal or the method (3) in which the pad wear limit is detected based on the vibrations of the projection, the pad wear is found only after the pad wear limit is reached. Therefore, the pad wear may progress beyond its limit in a situation where a maintenance work cannot be performed immediately. In addition, with such a method in which the pad is brought into direct contact with a brake rotor, the exhaustion of the brake rotor may be promoted at the time when the pad wear limit is reached.

With the method (4) in which the pad wear amount is estimated from relative positions of slide pins and a caliper, the area surrounding a brake cylinder, including the slide pin portion, is subjected to severe thermal and vibration conditions. Accordingly, in the case where a dedicated sensor configured to detect relative positions of the slide pins and the caliper is mounted in the area surrounding the brake cylinder, it is difficult to achieve desired durability and desired reliability of the dedicated sensor. Furthermore, the mounting of the dedicated sensor results in an increased cost, and a case or the like that protects the dedicated sensor from heat and vibrations is required, which may lead to an increased space.

SUMMARY OF THE INVENTION

An object of the present invention to provide an electric brake device that can prevent the pad wear from progressing beyond its limit, and can estimate the wear of the friction pad without an increase in the cost and the space.

Hereinafter, in order to facilitate the understanding, the present invention will be described with reference to the reference numerals used in embodiments for convenience sake.

An electric brake device according to the present invention includes: an electric motor 2; a brake rotor 5; a friction pad 6 configured to come into contact with the brake rotor 5 to generate a braking force; a transmission mechanism 4 configured to convert a rotary motion of the electric motor 2 into a motion with which the friction pad 6 generates the braking force; a braking force command section 26a configured to generate a command value of a target braking force by using an operation amount of a brake operation portion 29; a braking force estimation section 30 configured to obtain an estimated value of a braking force that presses the friction pad 6 against the brake rotor 5; a motor rotation angle detector 28 configured to detect a rotation angle of the electric motor 2; and a controller 7 configured to control the electric motor 2 according to the command value and the estimated value of the braking force, wherein the controller 7 is provided with a pad wear amount estimation section 37 configured to estimate a wear amount of the friction pad 6, and wherein the pad wear amount estimation section 37 estimates the wear amount of the friction pad 6 at a present time, or the time corresponding to the estimating timing, by comparing a correlation between the motor rotation angle detected by the motor rotation angle detector 28 and the braking force obtained by the braking force estimation section 30 with a defined correlation between a motor rotation angle and a braking force when the friction pad 6 is unworn.

The correlation between the motor rotation angle and the braking force is not limited to a direct correlation between the motor rotation angle and the braking force, and may also be an indirect correlation between rates of change or the like. The defined correlation includes a table or the like that is defined based on results of an experiment, simulation or the like, and is recorded in a rerecording portion 39 in a rewritable manner.

According to this configuration, the controller 7 causes the pad wear amount estimation section 37 to estimate the wear amount of the friction pad 6 through an operation of the brake operation portion 29. The brake operation portion 29 may be operated by either the controller 7 or a driver. The pad wear amount estimation section 37 compares a correlation between the motor rotation angle detected by the motor rotation angle detector 28 and the braking force obtained by the braking force estimation section 30 with a defined correlation between a motor rotation angle and a braking force when the friction pad 6 is in an unworn state.

From the result of this comparison, the pad wear amount estimation section 37 estimates the wear amount of the friction pad 6.

The correlation between the motor rotation angle and the braking force mainly depends on the rigidity of a brake caliper, the compression rigidity of a friction pad, the compression rigidity of a brake rotor, and the rigidity of a linear actuator. Among these, the rigidities of the brake caliper and the linear actuator are generally linear, do not change during continuous use of the brake, and are substantially known. In general, the wear amount of the brake rotor is smaller than the wear amount of the friction pad, and the compression deformation amount of the brake rotor is extremely smaller than the overall rigidity of the brake. Therefore, the wear of the brake rotor has substantially no influence on the overall rigidity of the brake.

On the other hand, the compression rigidity of the friction pad is much lower than that of the brake rotor or the like, and thus has a significant influence on the overall rigidity of the brake. Accordingly, as the rigidity of the friction pad increases with the progression of the wear of the friction pad, the overall rigidity of the brake increases. Therefore, the pad wear amount estimation section 37 can estimate the wear amount of the friction pad 6 from the change between a defined correlation between the motor rotation angle and the braking force when the friction pad is unworn and a correlation between the motor rotation angle and the braking force at the present time. For example, a motor rotation angle θ required for exerting a certain or constant braking force, i.e., a pad pressing force F changes to a motor rotation angle θ' as the wear of the friction pad 6 progresses. From a table, a map, or the like that defines such a relationship between the change amount and the wear amount, the pad wear amount estimation section 37 can accurately estimate the wear amount of the friction pad 6.

This enables the progression of the wear of the friction pad 6 to be detected at all times, thus making it possible to prevent the wear of the friction pad 6 from progressing beyond the wear limit, and to estimate the wear of the friction pad without an increase in cost and space. By predicting, to a certain degree, the timing at which the friction pad 6 reaches its wear limit, a maintenance work for the electric brake device is allowed to be performed at an appropriate time before the timing at which the wear limit is reached.

The wear of the friction pad 6 can be estimated, simply by: monitoring a correlation between the motor rotation angle and the braking force by using the motor rotation angle detector 28 that is originally provided in the electric motor 2 of the electric brake device; and comparing the correlation with the defined correlation. This eliminates the need to provide an additional dedicated sensor or the like, thus making it possible to achieve a greater cost reduction than the above-mentioned method (4) in which the pad wear amount is estimated from the relative positions of the slide pins and the caliper. In addition, this also eliminates the need to provide a case or the like for protecting the dedicated sensor from heat or vibrations, and it is therefore possible to achieve a greater space reduction than the method (4).

The braking force estimation section 30 may use a value detected by a load sensor 13 configured to detect an axial load of the transmission mechanism 4. In this case, the controller 7 causes a linear motion portion 14 of the transmission mechanism 4 to advance from a position separate from the brake rotor 5 to an outboard side, and obtains a minimum detection value, i.e., braking force that can be detected by the load sensor 13. With an increase in the operation amount of depressing the brake operation portion 29, the braking force detected by the load sensor 13 gradually increases. By using the value detected by the load sensor 13, it is possible to more accurately detect the braking force than by obtaining an estimated value of the braking force from a motor current and a sensor output of the brake operation portion 29.

The pad wear amount estimation section 37 may estimate the wear amount of the friction pad 6 from a correlation between respective rates of change of the braking force and the motor rotation angle, under a condition that a value of one of the braking force and the motor rotation angle continuously increases or continuously decreases by a prescribed value or higher. The above-described continuous increase and continuous decrease by the prescribed value or higher may be referred to as a "monotonous increase" and a "monotonous decrease", respectively. The monotonous increase and the monotonous decrease may be collectively referred to as a "monotonous change". The prescribed value may be defined based on results of an experiment, simulation, or the like.

The friction pad 6 exhibits a stronger nonlinearity for the correlation between the motor rotation angle and the pad pressing force F than the other rigid elements in a state in which the wear of the friction pad 6 is not in progress. However, with the progression of the pad wear, the correlation between the motor rotation angle and the pad pressing force approaches linearity. Then, whether the correlation between the motor rotation angle and the pad pressing force maintains nonlinearity or approaches linearity, i.e., the degree of progression of the pad wear may be determined by detecting a rate of change of the motor rotation angle (Δθ before pad friction, Δθ' after pad friction), for example, when the pad pressing force has changed from F1 to F2 by ΔF under a condition that the value of one of the pad pressing force and the motor rotation angle continuously increases or continuously decreases by the prescribed value or higher.

The pad wear amount estimation section 37 may include:

a linearity determination section 41 configured to determine a strength of linearity of the correlation between the braking force and the motor rotation angle from a change in a rate of change of one of the braking force and the motor rotation angle with respect to a rate of change of the other of the braking force and the motor rotation angle; and a wear amount estimation section 42 configured to estimate the wear amount of the friction pad 6 from the braking force or the motor rotation angle at which the strength of linearity of the correlation that is determined by the linearity determination section 41 is greater than or equal to a first threshold.

The first threshold may be defined, for example, based on results of an experiment, simulation, or the like.

The linearity determination section 41 obtains a change in a rate of change of one of the braking force and the motor rotation angle with respect to a rate of change of the other by, for example, double differentiating each of the parameters, and detects a strength of linearity of the correlation. At this time, there is a possibility that the detection accuracy is not stabilized for a region in which the braking force is extremely low. Therefore, a condition of being greater than or equal to a prescribed braking force or motor rotation angle may be additionally set. The wear amount estimation section 42 estimates the wear amount of the friction pad 6 from the braking force or the motor rotation angle at which the strength of linearity of the above-mentioned correlation is greater than or equal to the first threshold.

The controller 7 may be provided with a warning signal output section 33 configured to output a warning signal to a higher-order control unit 26 of the controller 7 when the wear amount of the friction pad 6 that is estimated by the pad wear amount estimation section 37 is greater than or equal to a second threshold. The second threshold may be defined as appropriate, for example, based on results of an experiment, simulation, or the like. The controller 7 may be provided with a wear limit reaching time output section 43 configured to: predict, from a difference of the wear amount in a prescribed time, a time required for the friction pad 6 to reach a wear limit; and output the predicted time to the higher-order control unit 26 of the controller 7.

In these cases, a warning display, a warning sound, or the like that is outputted from the higher-order control unit 26 allows the driver of a vehicle to recognize that the wear limit of the friction pad 6 is approaching. Therefore, a maintenance work for the electric brake device in which the wear limit of the friction pad 6 is approaching can be performed at an appropriate time before the wear limit is reached.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
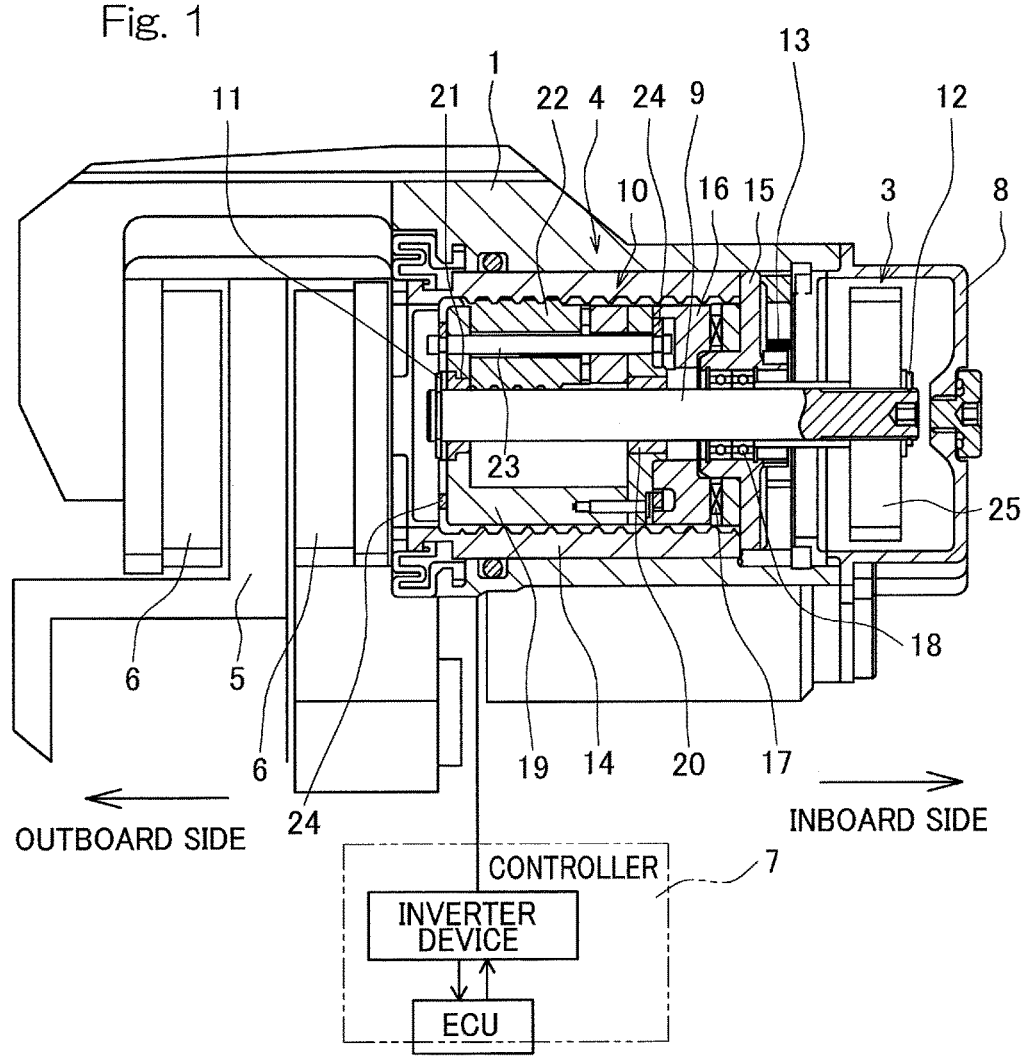
FIG. 1 is a cross-sectional view of an essential portion of an electric brake device according to an embodiment of the present invention.

An electric brake device according to an embodiment of the present invention will be described with reference to FIGS. 1 to 8. As shown in FIG. 1, the electric brake device includes a housing 1, an electric motor 2 (FIG. 2), a speed reduction mechanism 3 that reduces the speed of rotation of the electric motor, a linear motion mechanism 4 serving as a transmission mechanism, a brake rotor 5, a friction pad 6, a locking mechanism (not shown), and a controller 7 that controls the electric motor. The electric motor is supported by the housing 1. The linear motion mechanism 4 is incorporated into the housing 1 so as to apply a braking force to the brake rotor 5 (to a disc rotor in this example) by an output from the electric motor. The housing 1 has an opening end covered by a cover 8.

The linear motion mechanism 4 will now be described. The linear motion mechanism 4 is a mechanism that converts a rotary motion outputted from the speed reduction mechanism 3 into a linear motion and brings the friction pad 6 into contact with the brake rotor 5 or separates the friction pad 6 from the brake rotor 5. The linear motion mechanism 4 includes a rotation shaft 9 that is rotationally driven by the electric motor, a conversion mechanism section 10 that converts the rotary motion of the rotation shaft 9 into a linear motion, restraining sections 11 and 12, and a load sensor 13, which is also called a load cell or a force sensor. The conversion mechanism section 10 includes a linear motion portion 14, a bearing member 15, an annular thrust plate 16, a thrust bearing 17, a rolling bearing 18, a carrier 19, slide bearings 20 and 21, and a plurality of planetary rollers 22.

The linear motion portion 14 of a cylindrical shape is supported on the inner circumferential surface of the housing 1 such that the linear motion portion 14 is prevented from rotating and is movable in the axial direction. On the inner circumferential surface of the linear motion portion 14, a helical projection is helically formed so as to project by a predetermined distance in the radially inward direction. The plurality of planetary rollers 22 mesh with the helical projection.

The bearing member 15 is provided at one end side, in the axial direction, of the linear motion portion 14 in the housing 1. The bearing member 15 includes a flange portion that extends radially outward, and a boss portion. The plurality of rolling bearings 18 are fitted within the boss portion, and the rotation shaft 9 is fitted onto the inner diameter surface of an inner ring of each of the rolling bearings 18. The rotation shaft 9 is rotatably supported by the bearing member 15 through the plurality of rolling bearings 18.

The carrier 19 is provided on the inner circumference of the linear motion portion 14 so as to be rotatable relative to the rotation shaft 9. The carrier 19 has disks that face each other in the axial direction. The disk proximate to the bearing member 15 may be referred to as an inner disk, and the other disk may be referred to as an outer disk. The outer disk is provided with a distance adjustment member on a side surface facing the inner disk such that the distance adjustment member projects in the axial direction from the outer circumferential edge portion of the side surface. For adjusting the distances between the plurality of planetary rollers 22, a plurality of the distance adjustment members are arranged so as to be spaced equidistantly from each other in the circumferential direction. The two disks are integrated with each other with the distance adjustment members.

The inner disk is rotatably supported by the slide bearing 20 fitted between the inner disk and the rotation shaft 9. The outer disk has a shaft insertion hole formed at the center thereof and the slide bearing 21 is fitted into the shaft insertion hole. The outer disk is supported by the slide bearing 21 so as to be rotatable relative to the rotation shaft 9. The restraining sections 11 and 12 for receiving a thrust load and restraining the position of the rotation shaft 9 in the axial direction are provided on both end portions of the rotation shaft 9. Each of the restraining sections 11 and 12 includes, for example, a stopper composed of a washer or the like. Retaining rings for preventing the restraining sections 11 and 12 from being removed are provided on both end portions of the rotation shaft 9.

The carrier 19 has a plurality of roller shafts 23 spaced from each other in the circumferential direction. Opposite end portions of each roller shaft 23 are supported by the inner disk and the outer disk. That is, each of the two disks has a plurality of shaft insertion holes that are formed as long holes, and both end portions of each roller shaft 23 are inserted into the corresponding shaft insertion holes, whereby the roller shafts 23 are supported so as to be movable in the radial direction within the ranges of the length of the respective shaft insertion holes. Two elastic rings 24 are extended over the plurality of roller shafts 23 at both end portions thereof respectively so as to urge a set of the roller shafts 23 in the radially inward direction.

The planetary rollers 22 are rotatably supported by the corresponding roller shafts 23, and each planetary roller 22 is disposed between the outer circumferential surface of the rotation shaft 9 and the inner circumferential surface of the linear motion portion 14. Each planetary roller 22 is pressed against the outer circumferential surface of the rotation shaft 9 by the urging force of the elastic ring 24 extended over the plurality of roller shafts 23. By a rotation of the rotation shaft 9, each planetary roller 22 that is in contact with the outer circumferential surface of the rotation shaft 9 rotates due to a contact friction therebetween. On the outer circumferential surface of each planetary roller 22, a helical groove is formed so as to mesh with the helical projection of the linear motion portion 14.

The speed reduction mechanism 3 is a mechanism that reduces the speed of rotation of the electric motor 2 (see FIG. 2) and transmits the rotation thereof to an output gear 25 fixed to the rotation shaft 9. The speed reduction mechanism 3 includes a plurality of gear trains (not shown). In this example, the speed reduction mechanism 3 sequentially reduces, by the above-described gear trains, the speed of rotation of an input gear (not shown) mounted to a rotor shaft (not shown) of the electric motor 2, and allows the rotation to be transmitted to the output gear 25. The locking mechanism is configured to be able to switch between: a locking state in which a braking force reducing operation of the linear motion mechanism 4 is inhibited; and an unlocking state in which the braking force reducing operation is permitted.

Figure 2:
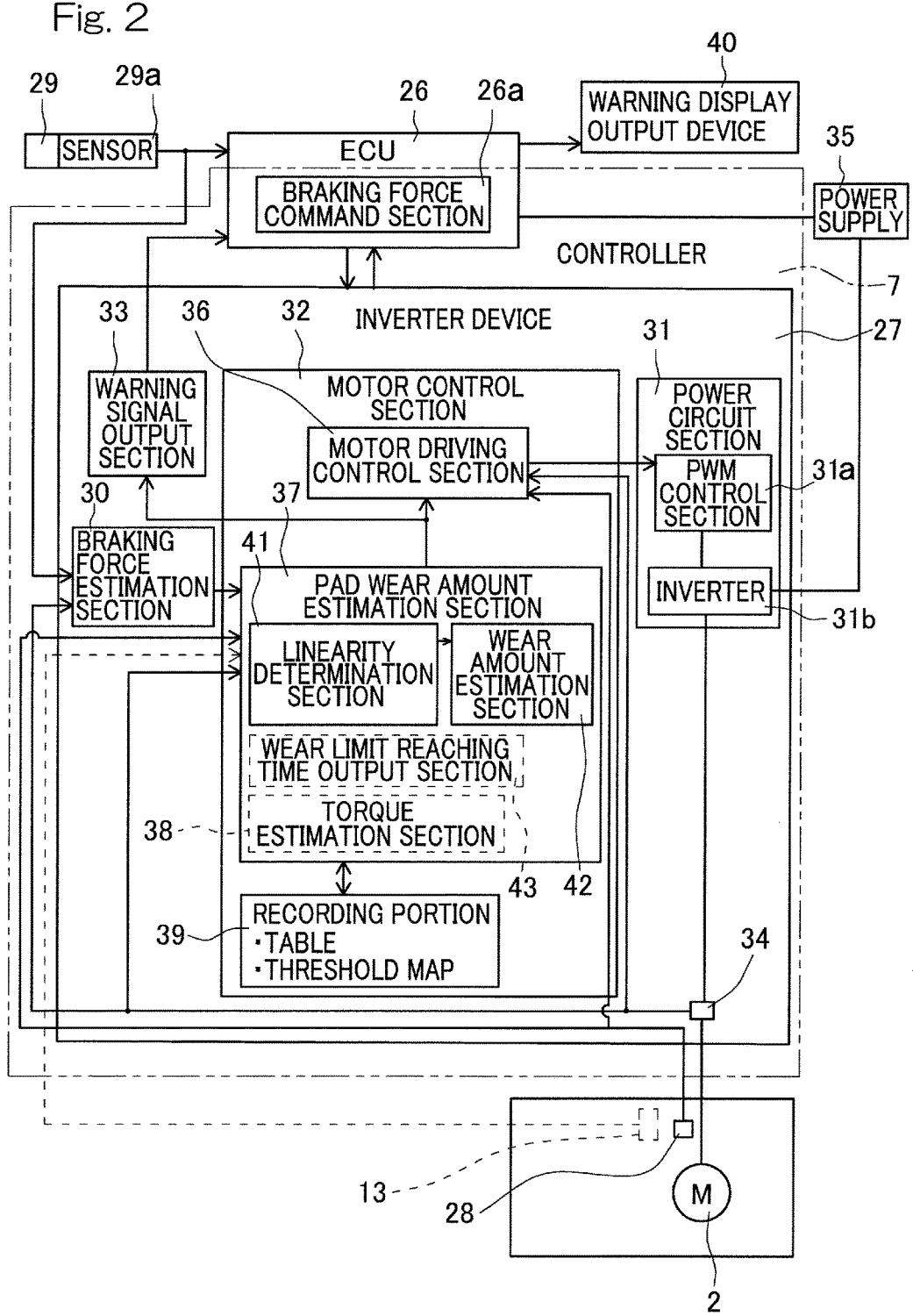
FIG. 2 is a block diagram of a control system of the electric brake device.

FIG. 2 is a block diagram of a control system of the electric brake device. The controller 7 of the electric brake device includes a braking force command section 26a provided in an ECU 26, and an inverter device 27. As the ECU 26 serving as a higher-order control unit of the inverter device 27, an electric control unit that performs overall control of a vehicle is applied, for example. In response to an output from a sensor 29a that varies according to the operation amount of a brake pedal serving as a brake operation portion 29, the braking force command section 26a generates and outputs a command value of a target braking force by using an LUT (Look Up Table) or a predetermined transform function or the like from a library. The brake operation portion 29 is not limited to a pedal input manner, and may be a button input manner a lever input manner or the like so long as it is used by the operator to provide an instruction to apply a brake.

The inverter device 27 includes: a braking force estimation section 30 that obtains an estimated value of the braking force that presses the friction pad 6 (FIG. 1) against the brake rotor 5 (FIG. 1); a power circuit section 31 provided for each electric motor 2; a motor control section 32 that controls the corresponding power circuit section 31; a warning signal output section 33, which will be described later; and a current detector 34.

The braking force estimation section 30 determines, from an output from a sensor 29a that varies according to the operation amount of the brake operation portion 29 and from a motor current detected by the current detector 34, an appropriate estimated value of the braking force by calculation using an LUT or a predetermined transform function or the like from a library. The relationship between the output of the sensor 29a, the motor current, and the estimated value of the braking force is defined in advance based on results of an experiment, simulation, or the like, and is recorded in a recording portion 39 in a rewritable manner.

In addition to this, the braking force estimation section 30 may include a load sensor 13 that detects an axial load of the linear motion mechanism 4. In this case, the controller 7 causes the linear motion portion 14 (FIG. 1) to advance from a position separate from the brake rotor 5 (FIG. 1) to an outboard side (FIG. 1) and obtains a minimum detection value, i.e., braking force that can be detected by the load sensor 13. With an increase in the operation amount of depressing the brake operation portion 29, the braking force detected by the load sensor 13 gradually increases. By using the value detected by the load sensor 13, it is possible to accurately detect the braking force. In addition, a torque estimation section 38 that estimates a torque of motor from the motor current detected by the current detector 34 may be provided, and the braking force may be estimated by using the torque estimated by the torque estimation section 38. The torque estimation section 38 calculates the motor torque by using, for example, an LUT or a predetermined transform function or the like from a library, and outputs the motor torque as an estimated value.

The motor control section 32 is composed of a computer including a processor, and electronic circuits such as a ROM (Read Only Memory) including programs to be executed by the processor, a RAM (Random Access Memory), and a co-processor. According to a command value of the braking force provided by the braking force command section 26a and to an estimated value of the braking force estimated by the braking force estimation section 30, the motor control section 32 converts these values into a current command represented by a voltage value, and provides the current command to the power circuit section 31. The motor control section 32 has a function for outputting, to the ECU 26, various types of information such as detected values and control values with respect to the electric motor 2.

The power circuit section 31 includes: an inverter 31b that converts DC power from a power supply 35 into three-phase AC power that is to be used for driving the electric motor 2; and a PWM control section 31a that controls the inverter 31b. The electric motor 2 is composed of a three-phase synchronous motor or the like. The electric motor 2 is provided with a motor rotation angle detector 28 that detects a rotation angle of a rotor (not shown), such as a rotation angle sensor or a rotary encoder. The inverter 31*b* includes a plurality of semiconductor switching elements (not shown), and the PWM control section 31*a* performs pulse width modulation of the inputted current command and provides an on/off command to each of the semiconductor switching elements.

The motor control section 32 includes a motor driving control section 36 as a basic control section thereof. According to the above-described command value and estimated value of the braking force, the motor driving control section 36 converts these values into a current command represented by a voltage value, and provides a motor operation command value including the current command to the PWM control section 31*a* of the power circuit section 31. The motor driving control section 36 obtains, from the current detector 34, the motor current supplied from the inverter 31*b* to the electric motor 2 and performs a current feedback control for the command value of the braking force. The motor driving control section 36 obtains a rotation angle of the rotor (not shown) of the electric motor 2, i.e., a motor rotation angle from the motor rotation angle detector 28, and provides the current command to the PWM control section 31*a* such that an efficient motor driving corresponding to the motor rotation angle is enabled.

The motor control section 32 is provided with a pad wear amount estimation section 37 and a recording portion 39, etc. The pad wear amount estimation section 37 compares a correlation between the motor rotation angle detected by the motor rotation angle detector 28 and the braking force obtained by the braking force estimation section 30 with a defined correlation between the motor rotation angle and the braking force when the friction pad 6 (FIG. 1) is unworn, and estimates the wear amount of the friction pad 6 (FIG. 1) at the present time, that is the time corresponding to the estimating timing (for example, the present time t mentioned below). The pad wear amount estimation section 37 calculates and outputs an estimated value of the wear amount as a result of comparison of the two correlation values by using, for example, an LUT or a predetermined comparison function, transform function or the like from a library.

The inverter device 27 is provided with a warning signal output section 33. The warning signal output section 33 outputs a warning signal to the ECU 26 when the wear amount of the friction pad 6 that is estimated by the pad wear amount estimation section 37 is greater than or equal to a second threshold. The warning signal output section 33 is implemented as, for example, a hardware or software comparator. The second threshold is recorded in the recording portion 39 in a rewritable manner. A console panel or the like of the vehicle may be provided with a warning display output device 40 such as a display, a warning lamp, or an audio output device. When the warning signal is inputted from the warning signal output section 33, the ECU 26 causes the warning display output device 40 to output a warning display or the like. The outputted warning display or the like allows the driver of the vehicle to recognize that the wear limit for the friction pad 6 is approaching.

Figure 3:
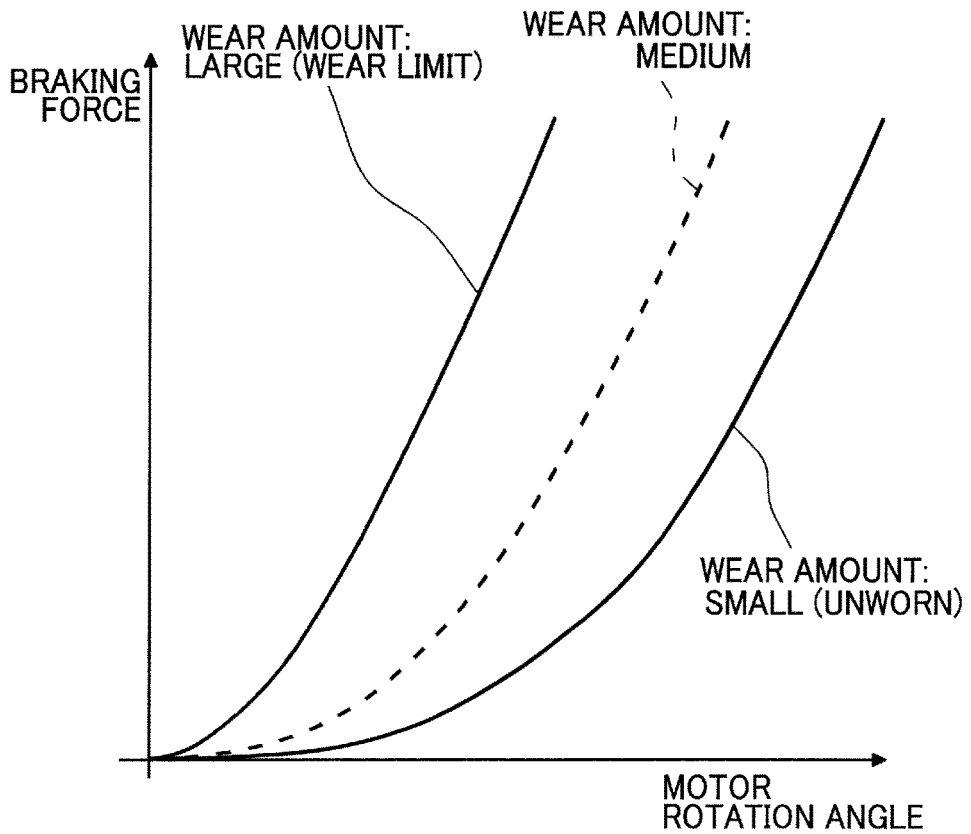
FIG. 3 is a graph showing an exemplary correlation between the motor rotation angle and the braking force corresponding to the degree of pad wear in the electric brake device.

FIG. 3 is a graph showing an exemplary correlation between the motor rotation angle (abscissa) and the braking force (ordinate) corresponding to the degree of pad wear in the electric brake device. The following description will be given also with appropriate reference to FIGS. 1 and 2. The correlation between the motor rotation angle and the braking force mainly depends on the rigidity of a brake caliper, the compression rigidity of the friction pad, the compression rigidity of the brake rotor, and the rigidity of a linear actuator. Among these, the rigidities of the brake caliper and the linear actuator are generally linear, do not change during continuous use of the brake, and are substantially known. In general, the wear amount of the brake rotor is smaller than the wear amount of the friction pad, and the compression deformation amount of the brake rotor is extremely smaller than the overall rigidity of the brake. Therefore, the wear of the brake rotor has substantially no influence on the overall rigidity of the brake.

On the other hand, the compression rigidity of the friction pad is extremely lower than that of the brake rotor or the like, and thus has a significant influence on the overall rigidity of the brake. Accordingly, as the rigidity of the friction pad increases with the progression of the wear of the friction pad, the overall rigidity of the brake increases. Therefore, the pad wear amount estimation section 37 can estimate the wear amount of the friction pad 6 from the change between a defined correlation between the motor rotation angle and the braking force when the friction pad is unworn and a correlation between the motor rotation angle and the braking force at the present time. As indicated by the solid line in FIG. 3, the friction pad 6 exhibits a strong nonlinearity for the correlation between the motor rotation angle and the braking force when the friction pad is unworn. As indicated by the dotted line in FIG. 3, in a state in which the pad wear amount is "medium", the correlation more closely approaches linearity than when the friction pad is unworn. As shown by the single dotted line in FIG. 3, in a state in which the friction pad 6 has reached the wear limit where the pad wear amount is large, the correlation further closely approaches linearity than in the state in which the pad wear amount is "medium".

Figure 4:
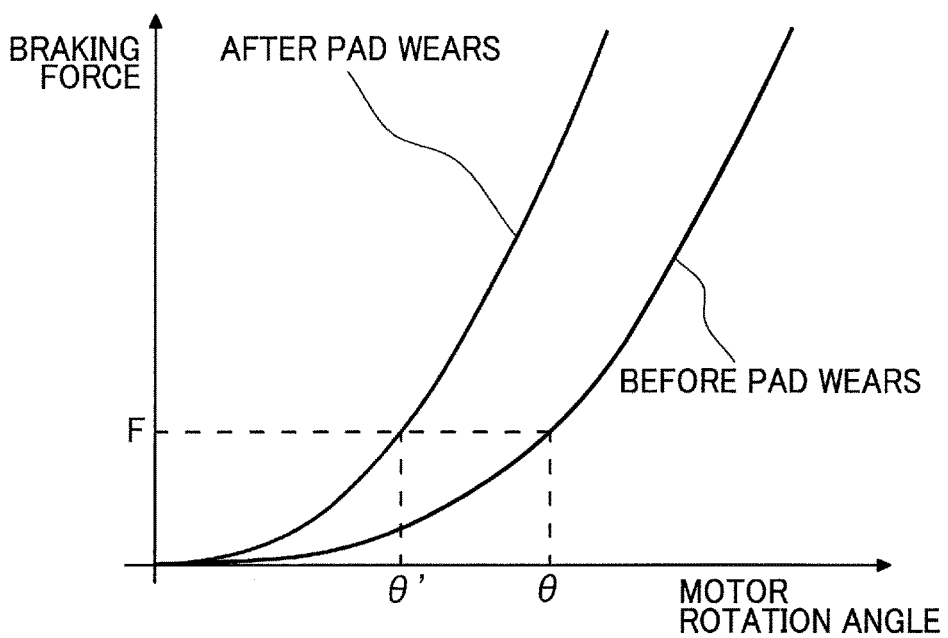
FIG. 4 is a graph showing an exemplary detection of the pad wear amount based on a correlation between the braking force and the motor rotation angle of the electric brake device.

FIG. 4 is a graph showing an exemplary detection of the pad wear amount based on the correlation between the braking force and the motor rotation angle of the electric brake device. A motor rotation angle $\theta$ required for exerting a certain or constant braking force, i.e., a pad pressing force F changes to a motor rotation angle $\theta'$ in a state in which the friction pad 6 has worn. The braking force F is estimated by the braking force estimation section 30. The motor rotation angle $\theta$ ($\theta'$) is detected by the motor rotation angle detector 28. The pad wear amount estimation section 37 can accurately estimate the wear amount of the friction pad 6, based on a table, a map, or the like that defines a relationship between the change amount of the motor rotation angle and the pad wear amount.

Figure 5:
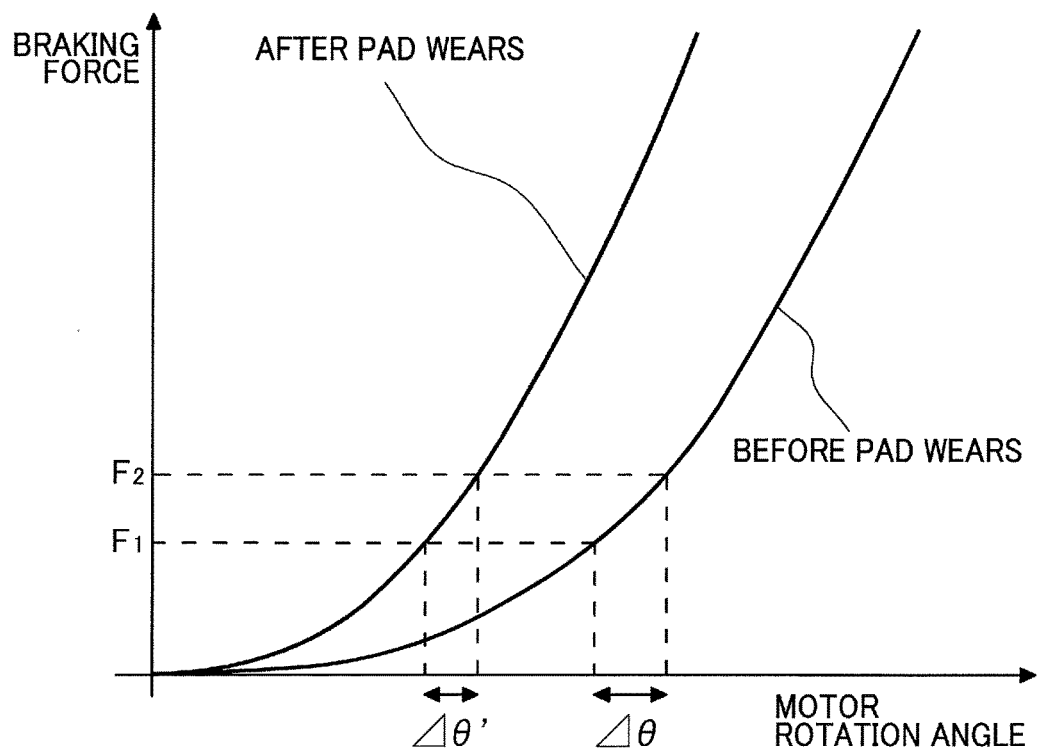
FIG. 5 is a graph showing an example in which the pad wear amount is estimated from the rate of change of the motor rotation angle when the braking force changes in the electric brake device.

FIG. 5 is a graph showing an example in which the pad wear amount is estimated from the rate of change of the motor rotation angle when the braking force changes in the electric brake device. As described above, the correlation between the motor rotation angle and the braking force approaches linearity as the pad wear progresses. Then, whether the correlation between the motor rotation angle and the braking force maintains nonlinearity or approaches linearity can be determined by detecting the rate of change $\Delta\theta$ ($\Delta\theta'$) of the motor rotation angle in FIG. 5 when the braking force has changed, for example, from F1 to F2 under a condition that the value of one of the braking force and the motor rotation angle continuously increases or continuously decreases by the prescribed value or higher. That is, the degree of progression of the pad wear can be determined. In the case of estimating the pad wear amount, the correlation between the respective rates of change of the motor rotation angle $\theta$ and the braking force F may be used. That is, the rate of change of one of the braking force and the motor rotation angle with respect to the rate of change of the other may be used, or the value of dF/dθ at a prescribed motor rotation angle θ or the value of dθ/dF at a prescribed braking force F may be used.

Figure 6:
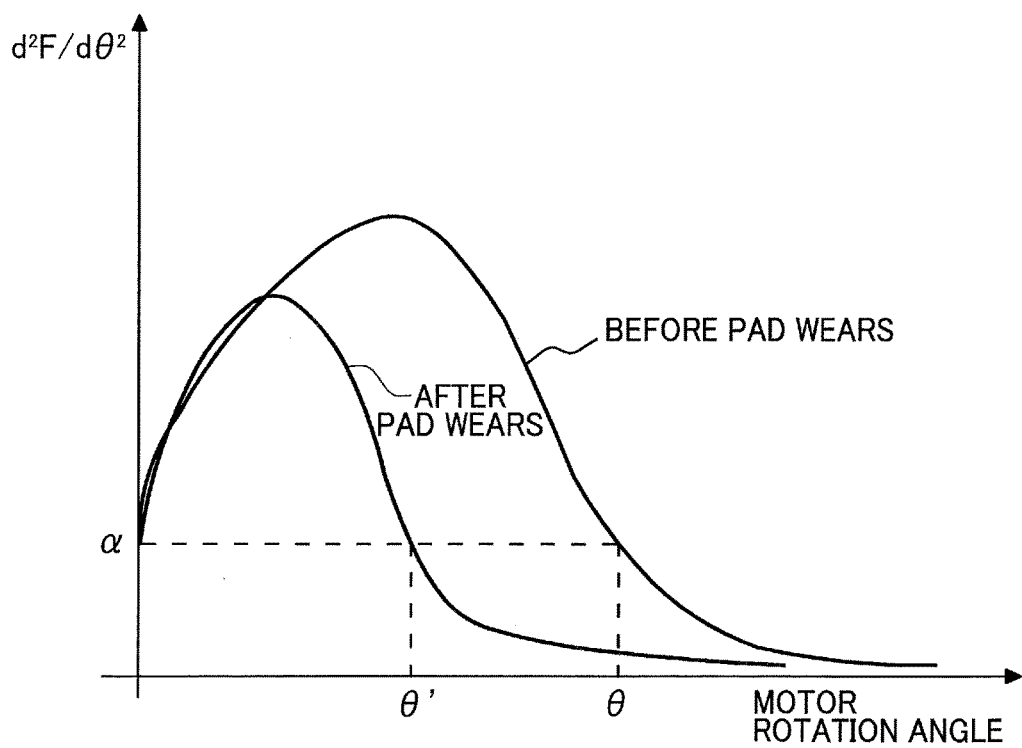
FIG. 6 is a graph showing an example in which the pad wear amount is estimated from the strength of nonlinearity of a correlation between the braking force and the motor rotation angle in the electric brake device.

FIG. 6 is a graph showing an example in which the pad wear amount is estimated from the strength of nonlinearity of the correlation between the braking force and the motor rotation angle in the electric brake device. The pad wear amount estimation section 37 of the electric brake device in this case includes a linearity determination section 41 and a wear amount estimation section 42 as shown in FIG. 2. The linearity determination section 41 determines a strength of linearity of a correlation between the braking force and the motor rotation angle from a change in the rate of change of one of the braking force and the motor rotation angle with respect to the rate of change of the other. The wear amount estimation section 42 estimates the wear amount of the friction pad 6 (see FIG. 1) from the braking force or motor rotation angle at which the strength of linearity of the above-scribed correlation that is determined by the linearity determination section 41 is greater than or equal to a first threshold. Upon reception of input of the braking force and the pad wear amount, the wear amount estimation section 42 calculates the pad wear amount by using an LUT or a predetermined transform function or the like from a library.

The linearity determination section 41 obtains the above-mentioned change in the rate of change of one of the braking force and the motor rotation angle with respect to the rate of change of the other by, for example, double differentiating each of the parameters, and detects the strength of linearity of the correlation. The linearity determination section 41 performs the double differentiation by using an LUT or a predetermined function or the like from a library. At this time, there is a possibility that the detection accuracy is not stabilized in the region in which the braking force is extremely low, and therefore, a condition of being greater than or equal to a prescribed braking force or greater than or equal to a prescribed motor rotation angle may be additionally set. The prescribed braking force or the prescribed motor rotation angle is determined from results of an experiment, simulation, or the like by using, as a reference, a minimum value of the braking force at which the detection accuracy is stabilized, or a minimum angle of the motor rotation angle at which the detection accuracy is stabilized.

Figure 7:
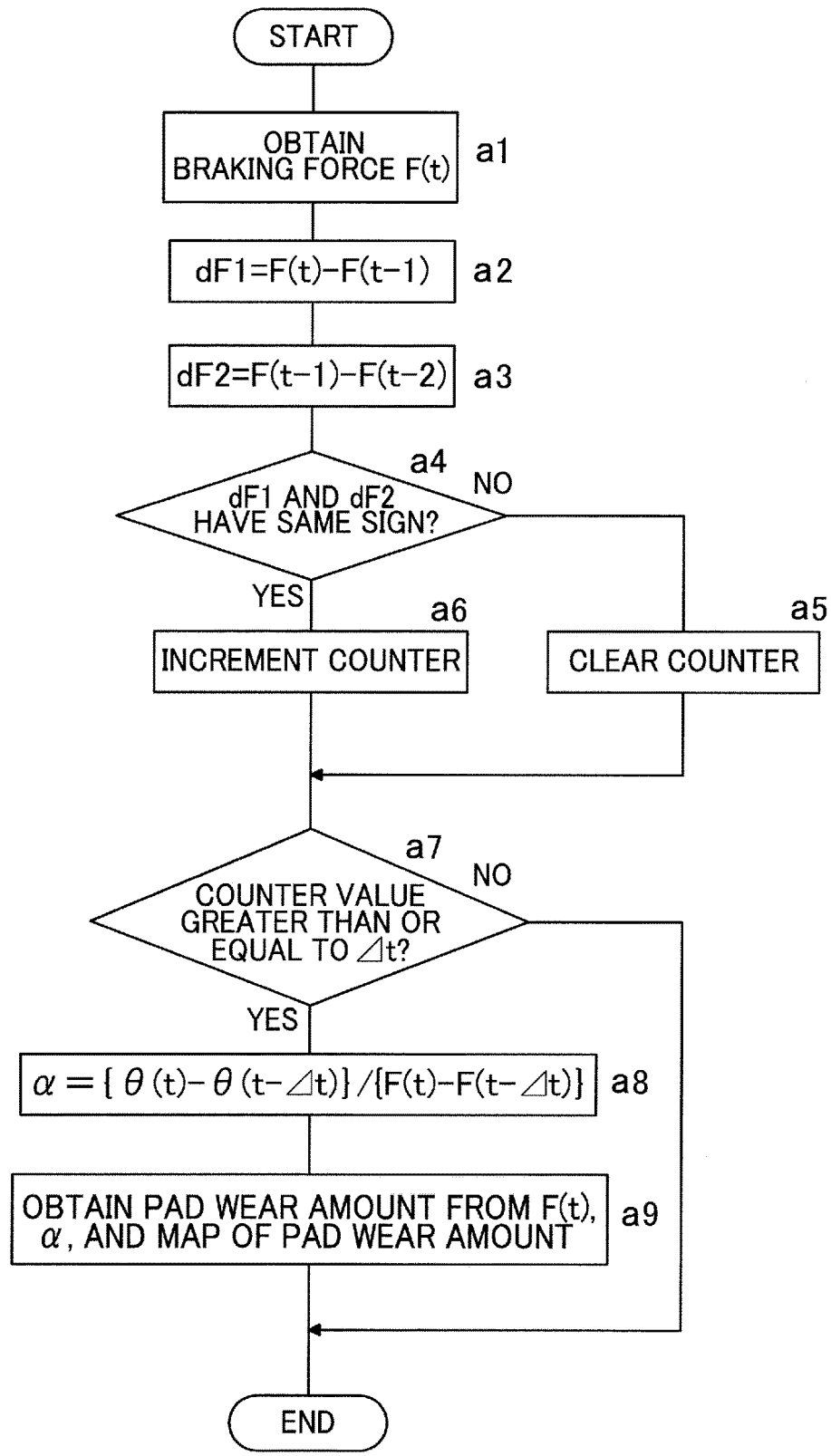
FIG. 7 is a flowchart for estimating the pad wear amount by using a correlation between rates of change of the braking force and the motor rotation angle in the electric brake device described with reference to FIG. 5.

FIG. 7 is a flowchart for estimating the pad wear amount by using the correlation between the rates of change of the braking force and the motor rotation angle in the electric brake device described, for example, with reference to FIG. 5. For example, the present process is started under a condition that a vehicle having the electric brake device mounted therein is temporarily or continuously parked, and the pad wear amount estimation section 37 determines whether or not the braking force has undergone a monotonous increase or a monotonous decrease, which are collectively referred to as a "monotonous change", before step a7, which will be described later. First, the pad wear amount estimation section 37 obtains a braking force F(t) at the above-mentioned present time t from the braking force estimation section 30 (step a1).

Next, the pad wear amount estimation section 37 calculates a value dF1 by subtracting a braking force F(t−1) at a time (t−1), which is the time before the time t, from the braking force F(t) (step a2). Next, the pad wear amount estimation section 37 calculates a value dF2 by subtracting a braking force F(t−2) at a time (t−2), which is the time before the time (t−1), from the braking force F(t−1) (step a3). The calculated values dF1 and dF2 are temporarily recorded, for example, in the recording portion 39.

Next, the pad wear amount estimation section 37 determines whether the calculated values dF1 and dF2 have the same sign (positive or negative) (step a4). If it is determined that the two values do not have the same sign, i.e., the braking force has not undergone a monotonous change (step a4: no), the pad wear amount estimation section 37 clears a counter to reset the counter value to zero (step a5). Thereafter, the process proceeds to step a7. If it is determined that the two values have the same sign, i.e., the braking force has undergone a monotonous change (step a4: yes), the pad wear amount estimation section 37 increments the counter (step a6).

Next, the pad wear amount estimation section 37 determines whether the counter value is greater than or equal to a prescribed Δt (step a7). For example, the above-described Δt is determined based on an experiment, a simulation, or the like, if the braking force has a change from which the pad wear amount can be estimated. If it is determined that the counter value is less than the prescribed Δt (step a7: no), the present process is ended. If it is determined that the counter value is greater than or equal to the prescribed Δt (step a7: yes), the process proceeds to step a8.

Next, the pad wear amount estimation section 37 calculates α by dividing the rate of change (θ(t)−θ(t−Δt)) of the motor rotation angle by the rate of change (F(t)−F(t−Δt)) of the braking force (step a8). Thereafter, the pad wear amount estimation section 37 obtains the wear amount of the friction pad 6 from the braking force F(t), the above-described α, and an LUT or a map that defines the relationship between the pad wear amount and the respective rates of change of the braking force and the motor rotation angle (step a9). Thereafter, the present process is ended.

Figure 8:
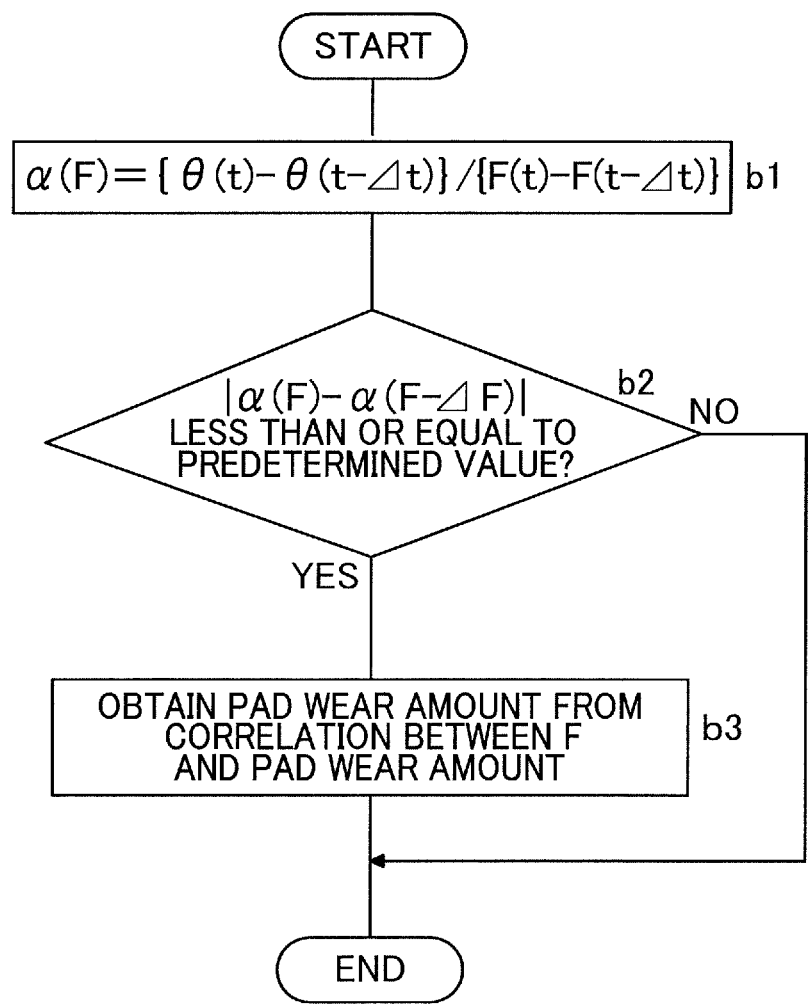
FIG. 8 is a flowchart for estimating the pad wear amount from the motor rotation angle or the braking force when a correlation between the braking force and the motor rotation angle approaches linearity in the electric brake device described with reference to FIG. 6.

FIG. 8 is a flowchart for estimating the pad wear amount from the motor rotation angle or the braking force when the correlation between the braking force and the motor rotation angle approaches linearity in the electric brake device described, for example, with reference to FIG. 6. For example, the present process is started under the same condition as that in FIG. 7, and the linearity determination section 41 obtains α(F) by dividing the rate of change (θ(t)−θ(t−Δt)) of the motor rotation angle by the rate of change (F(t)−F(t−Δt)) of the braking force (step b1).

Next, the linearity determination section 41 determines whether or not an absolute value, which corresponds to a double differential value, obtained by subtracting α(F−ΔF) from the obtained α(F) is less than or equal to a predetermined value (step b2). That is, the linearity determination section 41 determines the magnitude of the absolute value, which is the strength of linearity of the correlation between the braking force and the motor rotation angle. When the absolute value is less than or equal to the predetermined value, the strength of linearity of the correlation is greater than or equal to the first threshold, and a pad wear amount can be obtained at the subsequent step b3. Although FIGS. 7 and 8 illustrate an example of detection using the braking force, i.e., the pad pressing force, as a reference, any of the pad pressing force and the motor rotation angle may be used as a reference parameter.

If it is determined that the absolute value is greater than the predetermined value (step b2: no), the present process is ended. If it is determined that the absolute value is less than or equal to the predetermined value (step b2: yes), the wear amount estimation section 42 obtains a pad wear amount from the correlation between the braking force and the pad wear amount in the above-described manner (step b3). Thereafter, the present process is ended.

The electric brake device described above enables the progression of the wear of the friction pad 6 to be detected at all times, thus making it possible to prevent the wear of the friction pad 6 from progressing beyond its wear limit. By predicting, to a certain degree, the timing at which the friction pad 6 reaches its wear limit, a maintenance work for the electric brake device is allowed to be performed at an appropriate time before the timing at which the wear limit is reached.

The wear of the friction pad 6 can be estimated, simply by: monitoring the correlation between the motor rotation angle and the braking force by using the motor rotation angle detector 28 that is originally provided in the electric motor 2 of the electric brake device; and comparing the correlation with the defined correlation. This eliminates the need to provide an additional dedicated sensor or the like, thus making it possible to achieve a greater cost reduction than the above-mentioned method (4) in which the pad wear amount is estimated from the relative positions of the slide pins and the caliper. In addition, this also eliminates the need to provide a case or the like for protecting the dedicated sensor from heat or vibrations, and it is therefore possible to achieve a greater space reduction than the method (4).

As shown in FIG. 2, the pad wear amount estimation section 37 may be provided with a wear limit reaching time output section 43. The wear limit reaching time output section 43 predicts a time required for the friction pad 6 to reach its wear limit, from a difference of the wear amounts within a prescribed time by using an LUT or a predetermined operation function or the like from a library, and outputs the predicted time to the ECU 26 via the warning signal output section 33. When the predicted time is inputted from the warning signal output section 33, the ECU 26 causes the warning display output device 40 to output the predicted time and/or the warning display or the like. The outputted warning display or the like allows the driver of the vehicle to recognize that the wear limit of the friction pad 6 is approaching.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

1 . . . housing
2 . . . electric motor
4 . . . linear motion mechanism (transmission mechanism)
5 . . . brake rotor
6 . . . friction pad
7 . . . controller
9 . . . rotation shaft
13 . . . load sensor
26a . . . braking force command section
28 . . . motor rotation angle detector
29 . . . brake operation portion
30 . . . braking force estimation section
33 . . . warning signal output section
37 . . . pad wear amount estimation section
41 . . . linearity determination section
42 . . . wear amount estimation section
43 . . . wear limit reaching time output section

What is claimed is:

1. An electric brake device comprising:
an electric motor;
a brake rotor;
a friction pad configured to come into contact with the brake rotor to generate a braking force;
a transmission mechanism configured to convert a rotary motion of the electric motor into a motion with which the friction pad generates the braking force;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force,
wherein the controller is provided with a pad wear amount estimation section configured to estimate a wear amount of the friction pad,
wherein the pad wear amount estimation section estimates the wear amount of the friction pad at a present time by comparing a correlation between the motor rotation angle detected by the motor rotation angle detector and the braking force obtained by the braking force estimation section with a defined correlation between a motor rotation angle and a braking force when the friction pad is unworn, and
wherein the pad wear amount estimation section includes
a linearity determination section configured to determine a strength of linearity of the correlation between the braking force and the motor rotation angle from a change in a rate of change of one of the braking force and the motor rotation angle with respect to a rate of change of the other of the braking force and the motor rotation angle; and
a wear amount estimation section configured to estimate the wear amount of the friction pad from the braking force or the motor rotation angle at which the strength of linearity of the correlation that is determined by the linearity determination section is greater than or equal to a first threshold.

2. The electric brake device as claimed in claim 1, wherein the braking force estimation section uses a value detected by a load sensor configured to detect an axial load of the transmission mechanism.

3. An electric brake device comprising:
an electric motor;
a brake rotor;
a friction pad configured to come into contact with the brake rotor to generate a braking force;
a transmission mechanism configured to convert a rotary motion of the electric motor into a motion with which the friction pad generates the braking force;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and a controller configured to control the electric motor according to the command value and the estimated value of the braking force, wherein the controller is provided with a pad wear amount estimation section configured to estimate a wear amount of the friction pad, wherein the pad wear amount estimation section estimates the wear amount of the friction pad at a present time by comparing a correlation between the motor rotation angle detected by the motor rotation angle detector and the braking force obtained by the braking force estimation section with a defined correlation between a motor rotation angle and a braking force when the friction pad is unworn, and wherein the controller is provided with a warning signal output section configured to output a warning signal to a higher-order control unit of the controller when the wear amount of the friction pad that is estimated by the pad wear amount estimation section is greater than or equal to a second threshold.

4. The electric brake device as claimed in claim 3, wherein the braking force estimation section uses a value detected by a load sensor configured to detect an axial load of the transmission mechanism.

5. An electric brake device comprising:
an electric motor;
a brake rotor;
a friction pad configured to come into contact with the brake rotor to generate a braking force;
a transmission mechanism configured to convert a rotary motion of the electric motor into a motion with which the friction pad generates the braking force;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force, wherein the controller is provided with a pad wear amount estimation section configured to estimate a wear amount of the friction pad, wherein the pad wear amount estimation section estimates the wear amount of the friction pad at a present time by comparing a correlation between the motor rotation angle detected by the motor rotation angle detector and the braking force obtained by the braking force estimation section with a defined correlation between a motor rotation angle and a braking force when the friction pad is unworn, and wherein the controller is provided with a wear limit reaching time output section configured to
predict, from a difference of the wear amount in a prescribed time, a time required for the friction pad to reach a wear limit; and
output the predicted time to the higher-order control unit of the controller.

6. The electric brake device as claimed in claim 5, wherein the braking force estimation section uses a value detected by a load sensor configured to detect an axial load of the transmission mechanism.

* * * * *